United States Patent
Rice et al.

(10) Patent No.: US 10,470,357 B2
(45) Date of Patent: Nov. 12, 2019

(54) AIR SEEDER WITH INFINITELY ADJUSTABLE CONTROL VALVES

(71) Applicant: BOURGAULT INDUSTRIES LTD., St. Brieux (CA)

(72) Inventors: Haydon Rice, Asquith (CA); Scot Jagow, Saskatoon (CA)

(73) Assignee: BOURGAULT INDUSTRIES LTD., St. Brieux (CA)

( * ) Notice: Subject to any disclaimer, the term of this patent is extended or adjusted under 35 U.S.C. 154(b) by 178 days.

(21) Appl. No.: 15/710,633

(22) Filed: Sep. 20, 2017

(65) Prior Publication Data
US 2018/0077856 A1 Mar. 22, 2018

Related U.S. Application Data

(60) Provisional application No. 62/397,720, filed on Sep. 21, 2016.

(51) Int. Cl.
*A01C 7/08* (2006.01)
*A01B 49/06* (2006.01)
(Continued)

(52) U.S. Cl.
CPC ............... *A01C 7/084* (2013.01); *A01B 49/06* (2013.01); *A01C 7/088* (2013.01); *A01C 7/102* (2013.01);
(Continued)

(58) Field of Classification Search
CPC ........... A01C 7/084; A01C 7/081; A01C 7/08; A01C 7/00; A01C 7/088; A01C 7/102;
(Continued)

(56) References Cited

U.S. PATENT DOCUMENTS 7,690,440 B2    4/2010    Dean et al.
8,690,488 B2    4/2014    Jagow et al.
(Continued)

FOREIGN PATENT DOCUMENTS

CA      2940716 A1    3/2017

OTHER PUBLICATIONS

CA Application No. 2,979,447 received an office action dated Jul. 19, 2018, 4 pages.

*Primary Examiner* — Christopher J. Novosad
(74) *Attorney, Agent, or Firm* — Kilpatrick Townsend & Stockton LLP (57) ABSTRACT

An air distribution apparatus including a manifold body having ports with a delivery conduit connected to each port. A port valve is configured to communicate an interior of the manifold body with the delivery conduit associated with each port. A supply conduit is connected at an output end thereof to the interior of the manifold body and connected at an input end thereof to receive a product air stream with entrained agricultural products. An exhaust orifice is defined in the supply conduit and an exhaust valve configured to control a flow of pressurized air from an interior of the supply conduit through the exhaust orifice. The port valve and exhaust valve are controlled to operate oppositely to each other between their open and closed positions. The port and exhaust valves are also adjustable to intermediate positions between the open and closed positions.

37 Claims, 5 Drawing Sheets

(51) Int. Cl.
  *A01C 7/10* (2006.01)
  *A01C 7/20* (2006.01)
  *A01C 21/00* (2006.01)
  *B65G 53/46* (2006.01)
  *F16K 1/54* (2006.01)
  *F16K 21/02* (2006.01)
  *F16K 37/00* (2006.01)

(52) U.S. Cl.
  CPC ............ *A01C 7/205* (2013.01); *A01C 21/005* (2013.01); *B65G 53/4691* (2013.01); *F16K 1/54* (2013.01); *F16K 21/02* (2013.01); *F16K 37/0075* (2013.01)

(58) Field of Classification Search
  CPC ........... A01C 7/10; A01C 7/205; A01C 7/201; A01C 7/20; A01C 21/005; A01C 21/00; A01B 49/06; A01B 49/04; A01B 49/00; Y02P 60/16; Y02P 60/10; Y02P 60/00; B65G 53/4691; B65G 53/46; B65G 53/40; B65G 53/34; B65G 53/00; F16K 1/54; F16K 1/32; F16K 1/00; F16K 21/02; F16K 21/00; F16K 37/0075; F16K 37/00
  See application file for complete search history.

(56) References Cited

U.S. PATENT DOCUMENTS

| | | | |
|---|---|---|---|
| 8,950,260 B2 | 2/2015 | Gelinske et al. | |
| 9,295,191 B2 | 3/2016 | Jagow et al. | |
| 2014/0158033 A1* | 6/2014 | Jagow | A01C 7/082 111/174 |

* cited by examiner

AIR SEEDER WITH INFINITELY ADJUSTABLE CONTROL VALVES

FIELD OF THE INVENTION

This invention relates to the field of agricultural air seeders and in particular an air distribution apparatus with valves on the ports to control product distribution and an exhaust to maintain critical velocity of the air stream.

BACKGROUND

Agricultural air seeders include generally an implement frame and a plurality of furrow openers spaced across a width of the frame, and movable to a lowered operating position where the furrow openers engage the ground to create furrows as the frame moves along a field. Agricultural products such as seed, fertilizer, and the like are carried in tanks mounted on the frame or a cart pulled with the frame and distributed to the furrow openers by a product distribution system where one or more fans create one or more air streams and metering devices dispense the agricultural products into the air streams and the products are carried through an air distribution network made up of conduits and manifolds to the furrow openers, and then into the furrows. Furrow opener assemblies often create two (or more) separate furrows, and separate air streams carrying different agricultural products are connected so as to deposit the different products in the separate furrows.

There are different types of product distribution systems used on present day air seeders. In a Class A product distribution system, all agricultural products destined for a given furrow are metered into a single air stream in a primary supply conduit connected to a primary manifold. Such manifolds are generally a thin cylinder with an inlet in a top or bottom of the cylinder connected to the supply conduit to receive the air stream carrying agricultural products, and a number of outlet ports equally spaced around a circumferential wall. Flat fan manifolds are also known where the supply conduit directs the product air stream into one end of the a flat manifold body which divides the product air stream into channels with ports at the ends of the channels on the opposite end of the manifold body. Delivery conduits are connected to each port to carry the air stream further downstream to another manifold or to a furrow opener as the case may be.

In a Class A product distribution system the primary manifold provides primary division of the air stream and the agricultural products carried therein by dividing and directing the air stream into a number of different delivery conduits, each of which is in turn connected to a secondary manifold. The secondary manifold provides secondary division of the air stream and the agricultural products carried therein by dividing and directing the air stream into a number of different secondary conduits, each of which is connected to a furrow opener to direct the air stream, and the agricultural products carried therein, into a selected furrow.

In a Class B product distribution system the metering device itself is divided into a number of sections such that primary division of the agricultural products takes place prior to the products entering the air stream. Each conduit from a meter section is connected to a manifold which provides secondary division of the air stream and the agricultural products into a number of different secondary conduits, each of which is connected to a furrow opener as in the Class A system.

In a Class C system, all division of the agricultural products takes place at the metering device. The metering device is divided into a number of sections equal to the number of furrow openers, and a single conduit connects each meter section with each furrow opener.

Present day air seeders are often 80 or more feet wide, and a problem arises when a strip of a field to be seeded is much narrower than the seeder, as a considerable width of the field will be overlapped and seeded twice. It is most undesirable to leave even a narrow strip of a field unseeded as without crop competition weeds will flourish in the strip providing seed for future years weed growth. Seeding the adjacent field area twice however wastes valuable seed and fertilizer, and the crop on the twice seeded field area generally has reduced yield and/or quality.

Thus, it is desirable to provide a means to stop the delivery of agricultural products to furrow openers in the overlap area by providing individual control of the delivery of agricultural products to a number of different sections of furrow openers across the width of the air seeder. U.S. Pat. No. 7,690,440 to Dean et al. discloses a Class B product distribution system where the metering device is divided into a number of sections, and where gates are provided at each meter section that may be opened or closed to start or stop product flow from each meter section. The air seeder is configured so that each meter section supplies agricultural products to a downstream manifold and from there to furrow openers that are laterally arranged in order across a section of the width of the seeder so that stopping product flow to any manifold stops product flow to a section of the air seeder. Thus, as the strip of field to be seeded narrows to less than the width of the air seeder, product delivery is stopped to sections of the air seeder passing over previously seeded ground.

Commonly owned U.S. Pat. Nos. 8,690,488 and 9,295,191, the disclosures of which are hereby incorporated by reference, are directed to a system and method for operating an air seeder to ensure that air speed is maintained above a critical product transport velocity in the distribution network as ports are closed and opened, and to clear agricultural products from delivery conduits and manifolds downstream of a closed or blocked port. This system and method makes use of valves that are either in the fully open or fully closed position to accomplish their control function.

SUMMARY OF THE INVENTION

It is an object of the present invention to provide an improved air distribution manifold apparatus for an air seeder that permits adjustment of the control valves to intermediate positions between the open and closed positions for improved control of product distribution.

In a first embodiment, the present invention provides an air distribution apparatus comprising:

a manifold body, and a plurality of ports defined through a wall of the manifold body;

a delivery conduit connected to each one of the plurality of ports;

on at least one of the plurality of ports, a port valve configured to communicate an interior of the manifold body with the delivery conduit associated with the at least one of the plurality of ports;

a supply conduit connected at an output end thereof to the interior of the manifold body, and connected at an input end thereof to receive a product air stream with agricultural products entrained therein;

an exhaust orifice defined in the supply conduit, and an exhaust valve configured to control a flow of pressurized air from an interior of the supply conduit through the exhaust orifice;

wherein the port valve and exhaust valve are controlled to operate oppositely to each other between open and closed positions of each valve such that when the port valve is in the closed position, the exhaust valve is in the open position with the delivery conduit being disconnected from the interior of the manifold body and, when the exhaust valve is in the closed position, the port valve is in the open position and pressurized air from the interior of the supply conduit is prevented from flowing through the exhaust orifice; and wherein the port valve and the exhaust valve are adjustable to intermediate positions between the open and closed positions.

In a second embodiment, the present invention provides an air distribution apparatus comprising:

a manifold body, and a plurality of ports defined through a wall of the manifold body;

a delivery conduit connected to each one of the plurality of ports;

on at least one of the plurality of ports, a port valve configured to communicate an interior of the manifold body with the delivery conduit associated with the at least one of the plurality of ports;

a supply conduit connected at an output end thereof to the interior of the manifold body, and connected at an input end thereof to receive a product air stream with agricultural products entrained therein;

at least one exhaust orifice defined in the supply conduit;

wherein the port valve is controlled to operate between open and closed positions of the valve such that when the port valve is in the closed position the delivery conduit is disconnected from the interior of the manifold body and pressurized air from the interior of the supply conduit flows through the at least one exhaust orifice; and wherein the port valve is adjustable to intermediate positions between the open and closed position.

In a third embodiment, the present invention provides an air distribution apparatus comprising:

a manifold body, and a plurality of ports defined through a wall of the manifold body;

a delivery conduit connected to each one of the plurality of ports;

a plurality of port valves, each one of the plurality of port valves being associated with one of the plurality of ports in the manifold body to communicate an interior of the manifold body with the delivery conduit connected to the port;

a supply conduit connected at an output end thereof to the interior of the manifold body, and connected at an input end thereof to receive a product air stream with agricultural products entrained therein;

at least one exhaust orifice defined in the supply conduit having an exhaust conduit communicating the at least one exhaust orifice and the delivery conduits for flow of pressurized air through the exhaust orifice to the delivery conduits;

wherein each one of the plurality of port valves is controlled to operate between open and closed positions such that when the port valve is in the closed position the corresponding delivery conduit is disconnected from the interior of the manifold body, and pressurized air from the interior of the supply conduit flows through the at least one exhaust orifice to the corresponding delivery conduit; and wherein each one of the plurality of port valves is adjustable to intermediate positions between the open and closed positions.

In a fourth embodiment, the present invention provides a method of controlling delivery of an agricultural product to a selected section of furrow openers of an air seeder, the method comprising:

for each air seeder section providing a delivery conduit connected at an output end thereof to deliver the agricultural product to the section of furrow openers, and connected at an input end thereof to a port defined through a wall of a manifold body;

connecting an output end of a supply conduit to an interior of the manifold body, and directing a product air stream with the agricultural product entrained therein into an input end of the supply conduit such that the agricultural product moves through the supply conduit, the manifold body, the ports, and the delivery conduits to each section of furrow openers;

providing a port valve configured to control communication of the delivery conduit with an interior of the manifold body through the port;

providing an exhaust orifice defined in the supply conduit with an exhaust valve;

wherein the port valve and the exhaust valve are controllable to operate oppositely to each other between open and closed positions of the port valve and the exhaust valve such that when the port valve is closed the exhaust valve is open with the port valve and exhaust valve being adjustable to intermediate positions between the open and closed positions; and configuring the port valve to adjust the selected port to permit a predetermined delivery of the agricultural product to the selected section of furrow openers, with the exhaust valve being configured to exhaust a flow of pressurized air from the supply conduit to compensate for a decrease in flow through the port valve.

In a fifth embodiment, the present invention provides a method of controlling delivery of an agricultural product to a selected section of furrow openers of an air seeder, the method comprising:

for each air seeder section providing a delivery conduit connected at an output end thereof to deliver the agricultural product to the section of furrow openers, and connected at an input end thereof to a port defined through a wall of a manifold body;

connecting an output end of a supply conduit to an interior of the manifold body, and directing a product air stream with the agricultural product entrained therein into an input end of the supply conduit such that the agricultural product moves through the supply conduit, the manifold body, the ports, and the delivery conduits to each section of furrow openers;

providing a port valve configured to control communication of the delivery conduit with an interior of the manifold body through the port;

providing an exhaust orifice defined in the supply conduit;

wherein the port valve is controllable to operate between open and closed positions of the port valve such that when the port valve is in the closed position, the delivery conduit is disconnected from the interior of the manifold body and pressurized air from the interior of the supply conduit flows through the exhaust orifice;

configuring the port valve to adjust the port to permit a predetermined delivery of the agricultural product to the selected section of furrow openers, with the exhaust orifice exhausting a flow of pressurized air from the supply conduit to compensate for a decrease in flow through the port valve.

Embodiments of the present invention thus provide improved sectional control by using control valves that are infinitely adjustable between open and closed positions to enable the rate of product flow to a section to be adjusted for additional functionality of the air seeding system.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
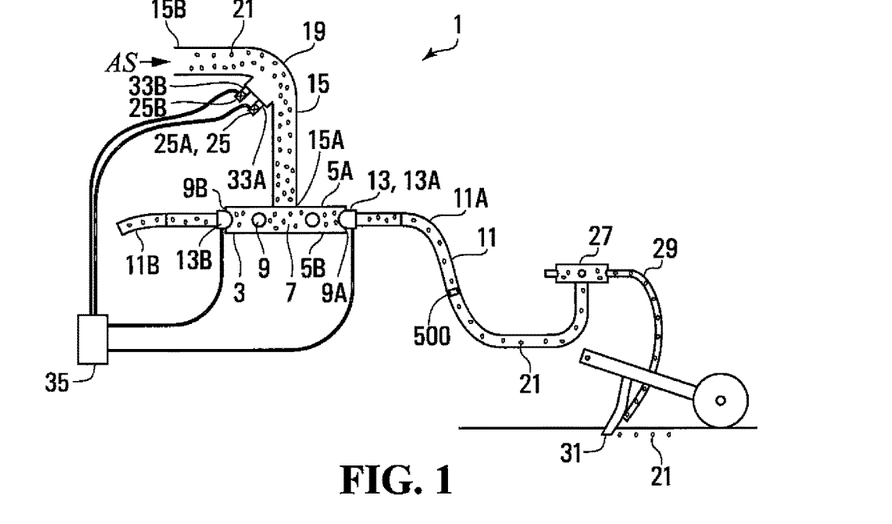
FIG. 1 is a schematic cutaway side view of an embodiment of an air distribution apparatus of the present invention with the port valves open and the exhaust valves closed.
Figures 2, 3:
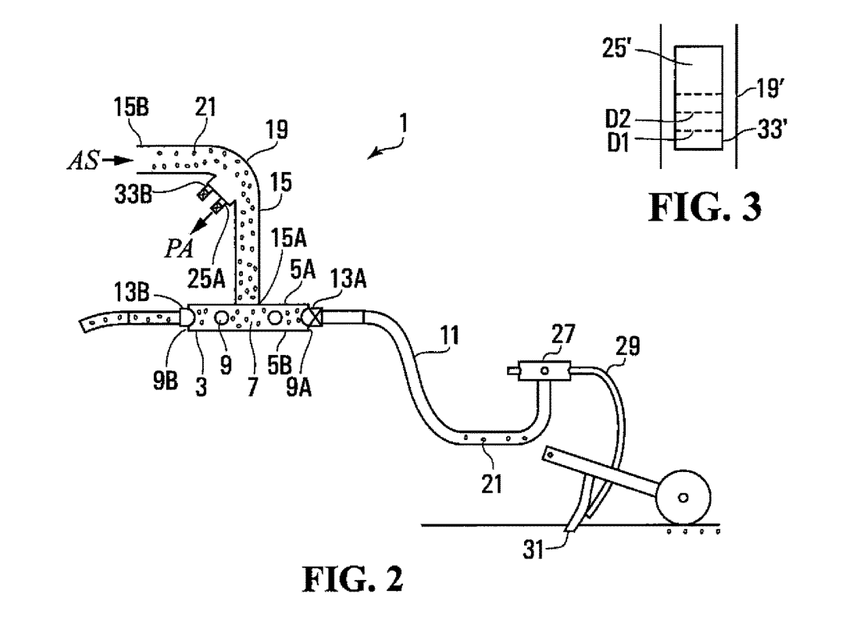
FIG. 2 is a schematic cutaway side view of the embodiment of FIG. 1 with one port valve closed and one exhaust valve open.
FIG. 3 is a schematic front view of an alternate exhaust valve for use with the embodiment of FIG. 1.
Figures 5, 6:
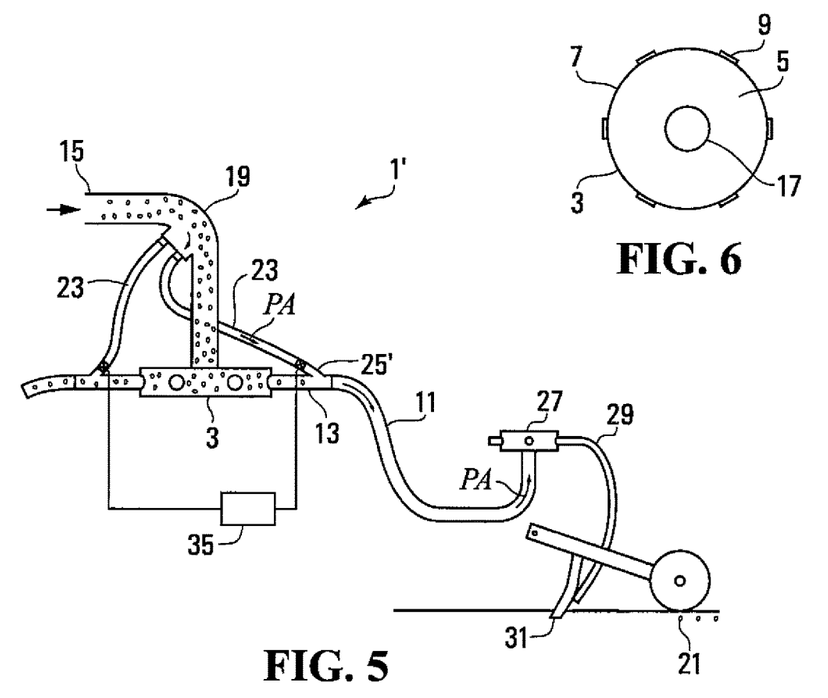
FIG. 5 is a schematic cutaway side view of the embodiment of FIG. 4 with one port valve closed and one exhaust valve open such that exhaust air is directed through the delivery conduit.
FIG. 6 is a schematic top view of the manifold body of the embodiment of FIG. 1.

FIGS. 1 and 2 schematically illustrate an embodiment of an air distribution apparatus 1 of the present invention. The apparatus 1 is shown as part of an air seeder product distribution network. The apparatus 1 comprises a manifold body 3 comprising substantially circular top and bottom plates 5, as illustrated in FIG. 6, oriented substantially horizontally, and a substantially vertical body wall 7 extending between the top and bottom plates 5A, 5B. Ports 9 are defined through the body wall 7, and a delivery conduit 11 is connected to each port 9.

A port valve 13 is configured such that when the port valve 13 is open, as illustrated in FIG. 1, the delivery conduit 11 is connected to the interior of the manifold body 3 through the port 9, and such that when the port valve 13 is closed, as illustrated in FIG. 2, the delivery conduit 11 is disconnected from the interior of the manifold body 3.

A substantially vertically oriented supply conduit 15 is connected at an output end 15A thereof to the interior of the manifold body 3 through an aperture 17 in the top plate 5A. The supply conduit 15 extends substantially vertically up from the manifold body 3 to a curved elbow 19 and then extends substantially horizontally from the elbow 19 to an input end 15B thereof that is connected to receive a product air stream AS with agricultural products 21 entrained therein. The product air stream AS is provided by a conventional air seeder fan and metering system.

An exhaust orifice 33 is defined in the elbow 19 at an inner radius of the elbow 19. An exhaust valve 25 is configured such that as the exhaust valve 25 is open, as schematically illustrated in FIG. 2, a selected flow of pressurized air PA flows from an interior of the supply conduit 15 through the exhaust orifice 33. When the exhaust valve 25 is closed, as schematically illustrated in FIG. 1, pressurized air from the interior of the supply conduit 15 is prevented from flowing through the exhaust orifice 33. The port valve 13 and exhaust valve 25 are controlled such that when the port valve 13 closes, the exhaust valve 25 opens. Intermediate positions of the port valve and the exhaust valve are also possible in that port valve 13 and exhaust valve 25 are controllable to operate oppositely to each other between their open and closed positions.

In operation when seeding, agricultural products are carried in the air stream AS from the tanks carrying various seed, fertilizer, and/or mixtures of same or like products. The air stream AS and entrained products enter the manifold body 3 which is designed so that substantially equal portions of the air stream AS and agricultural products exit through each port 9 into the delivery conduits 11 and, in the illustrated apparatus, to a secondary manifold 27 which again divides the air stream AS and entrained agricultural products substantially equally to each secondary delivery conduit 29 and then to the furrow openers 31.

When it is desired to turn off the flow of agricultural products 21 to the secondary manifold 27, the port valve 13 is closed, and one of the exhaust valves 25 is opened by a controller 35. The closing of the port valve 13 will typically be triggered by an operator who has visually determined that the furrow openers 31 fed by the secondary manifold 27 are passing through previously seeded soil, or by a global positioning system GPS which has determined the same thing. The air flow in the delivery conduit 11 and downstream from there stops when the port valve 13 closes, and at the same time the exhaust valve 25 opens.

Similarly, when it is desired to vary the flow of agricultural products 21 to the secondary manifold 27, the port valve 13 is adjusted to an intermediate position, and one of the exhaust valves 25 is also adjusted accordingly by controller 35. The port valve and the exhaust valve are controlled such that as the port valve is closed to intermediate positions, the exhaust valve opens to an extent such that the selected flow of pressurized air flowing from the interior of the supply conduit through the exhaust orifice substantially compensates for any decrease in flow through port valve. In a preferred arrangement, the intermediate positions of the exhaust valve and the port valve operate substantially in an inverse variation relationship to each other.

The size of the exhaust orifice 33 is typically configured such that the selected flow of pressurized air PA flowing through the exhaust orifice 33 when the exhaust valve 25 is open is substantially the same as an amount of air flowing through the port 9 when the port valve 13 is open. Thus the volume of air flow through the supply conduit 15 upstream from the elbow 19 is maintained at about the same amount whether the port valve 13 is open or closed, and critical velocity of the product air stream AS will be maintained to prevent agricultural products from falling out of the air stream.

In the illustrated apparatus 1, the exhaust orifices 33 are preferably defined in the wall of the elbow 19 that forms the inner radius of the elbow 19. It has been found that a clean air stream, with substantially no agricultural products entrained therein, can be drawn off the product carrying air stream AS at the inner radius since the agricultural products 21 follow the outer radius of the elbow 19 when making the turn from the horizontal to the vertical direction. Thus the selected flow of pressurized air PA can be drawn out of the supply conduit without losing any product 21.

In the illustrated apparatus 1 as well, the supply conduit 15 extends vertically down from the elbow 19 to the manifold body 3. It can be seen that as pressurized air is drawn off at the elbow 19 through one or more of the exhaust orifices 33, less air is moving through the vertical portion of the supply conduit 15. With the product air stream AS moving downward, the reduced volume of air in the air stream AS does not adversely affect the movement of the entrained product to the manifold 3 as same is drawn down by gravity.

The apparatus 1 comprises first and second ports 9A, 9B, first and second delivery conduits 11A, 11B, and first and second port valves 13A, 13B connecting the corresponding first and second delivery conduits 11A, 11B to the first and second ports 9A, 9B. First and second exhaust orifices 33A, 33B are defined in the inner radius of the elbow 19. There are corresponding first and second exhaust valves 25A, 25B associated with the exhaust orifices for adjusting the flow of pressurized air flows from the interior of the supply conduit 15 through the corresponding first and second exhaust orifices 33A, 33B.

The first port valve 13A and first exhaust valve 25A can be controlled such that when the first port valve 13A closes, the first exhaust valve 25A opens, and in the same manner when the second port valve 13B closes, the second exhaust valve 25B opens. The selected flow of pressurized air PA flowing through the exhaust orifices 33A, 33B when the first and second exhaust valves 25A, 25B are open is substantially the same as an amount of air flowing through the first and second ports 9A, 9B when the corresponding first and second port valves 13A, 13B are open.

When the valves are controlled to intermediate positions, the first and second port valves 13A and 138 and the first and second exhaust valve 25A and 25B are controlled such that as each port valve is closed to an intermediate position, the associated exhaust valve opens to an extent such that the selected flow of pressurized air PA flowing from the interior of the supply conduit through the exhaust valve substantially compensates for any decrease in flow through the port valve.

Where, as is typical, a manifold includes six to twelve ports, an exhaust orifice and valve can be provided for each port.

Alternatively, a single exhaust valve 25' can be provided as schematically illustrated in FIG. 3. In a system with the exhaust valve 25', the first and second port valves 13A, 13B and the exhaust valve 25' are controlled such that as the first or the second port valve close to intermediate positions, the exhaust valve 25' opens to an appropriate extent, illustrated by the dotted lines D1, such that the flow of pressurized air flowing from the interior of the supply conduit through the exhaust orifice compensates for any decrease in flow through the first and second port valves. In other words, a first selected flow of pressurized air, substantially equal to the amount of air flowing through one of the ports when one port valve is open, flows from the inner radius of the elbow 19' of the supply conduit through the exhaust orifice 33'. As both the first and the second port valves 13A, 13B move toward closed positions, the exhaust valve 25' opens to a larger extent, illustrated by dotted line D2, such that a greater flow of pressurized air flows from the supply conduit through the exhaust orifice 33' to compensate for any decrease in the air flowing through the first and second ports. Where further ports are provided, the operation of exhaust valve 25' is adjusted accordingly.

Thus, the velocity of the air stream AS in the horizontal portion of the supply conduit is maintained above the critical velocity. In the apparatus 1, the exhaust orifice 33 is open to the atmosphere, such that pressurized air PA from the interior of the supply conduit 15 flows through the exhaust orifice 33 into the atmosphere when the exhaust valve 25 is open.

Figure 4:
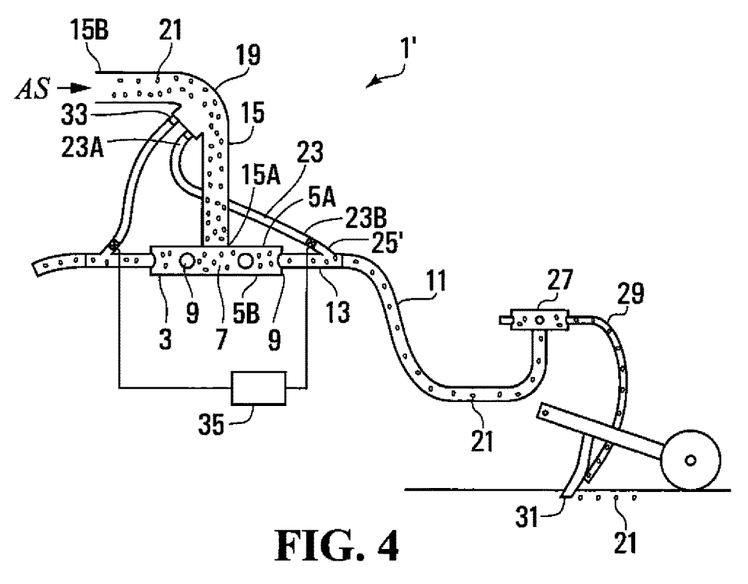
FIG. 4 is a schematic cutaway side view of an embodiment of an air distribution apparatus of the present invention where the exhaust is connected to and directed into the delivery conduits, and shown with the port valves open and the exhaust valves closed.

As illustrated in the apparatus 1' of FIGS. 4 and 5, an exhaust conduit 23 can be connected at an input end 23A thereof to the exhaust orifice 33 and with an output end 23B thereof connected to an exhaust destination, such that the selected flow of pressurized air PA flows through the exhaust conduit 23. The exhaust destination can be selected to suit the particular circumstances; however, beneficially in the apparatus 1', the exhaust conduit 23 is connected at the output end 23B thereof to the delivery conduit 11 in proximity to the port 9. Although the exhaust valve could remain on the exhaust orifice 33 at the input end 23A of the exhaust conduit 23, in the illustrated apparatus 1', the exhaust valve 25' is moved to the output end of the exhaust conduit 23 to facilitate mounting the port valve 13 and exhaust valve 25' in a combined valve assembly.

Thus, when the port valve 13 is closed and the exhaust valve 25' is open, as illustrated in FIG. 5, the delivery conduit 11 is connected to the exhaust conduit 23 and the selected flow of pressurized air PA flows through the exhaust conduit 23 into the delivery conduit 11. Thus, instead of the air flow in the delivery conduit 11 and downstream from there immediately stopping as in the prior art gated manifold ports, when the port valve 13 closes, the exhaust valve 25' opens such that a clean air stream, the pressurized air PA with substantially no agricultural products entrained therein, flows from the inner radius of the elbow 19 into the delivery conduit 11 and downstream through the secondary manifold 27 and secondary delivery conduits 29.

The arrangement of FIG. 5 can also be operated using port and exhaust valves movable to intermediate positions between the open and closed positions of the valves. As with previous embodiments, the valves are controlled by controller 35 such that as a port valve is closed to intermediate positions, the associated exhaust valve opens to an extent such that the flow of pressurized air through the exhaust valve substantially compensates for any decrease in flow through the port valve.

Thus, the velocity of the air stream AS through the supply conduit 15 upstream from the elbow 19 is maintained and as well, agricultural products remaining in the distribution network downstream from the blocked port are pushed out to the furrow openers 31 so that the products do not fall and block the conduits. When the exhaust valve 25' is closed, as illustrated in FIG. 4, the delivery conduit 11 is disconnected from the exhaust conduit 23 and connected to the port to receive the product air stream AS.

Figure 7:
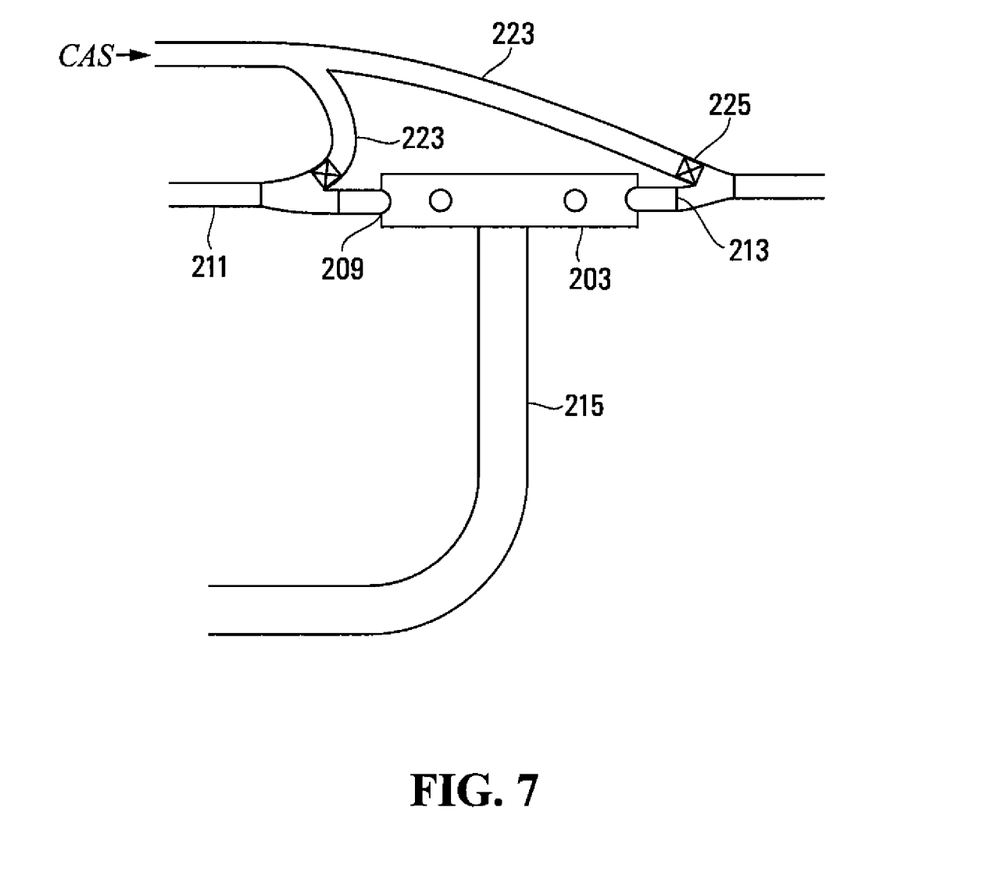
FIG. 7 is a schematic side view of an embodiment of an air distribution manifold apparatus of the present invention where the supply conduit extends vertically down from the manifold body, and wherein the clean air stream is obtained at a remote source such as directly from the air seeder fan or an auxiliary fan.

FIG. 7 schematically illustrates a further alternative embodiment with a manifold body 203, ports 209, port valves 213, delivery conduits 211, and supply conduit 215 where the exhaust conduits 223 are connected to a clean air stream CAS that is drawn off the distribution network at some earlier point where a clean air stream might be available, such as directly off the fan output prior to the meter, or from a separate pressurized air source altogether. When the port valve closes, the exhaust valve 225 opens and the clean air stream CAS flows through the delivery conduit to clear agricultural products from any downstream conduits, manifolds, and the like.

The valves used in the various embodiments of the present apparatus are fully adjustable units which include a movable member, such as a gate or piston, positionable between the open and closed positions of the valve to adjust an extent to which the valve is open. The valve is calibrated and provides an output signal based on the position of the movable member within the valve. Through the use of position feedback (position sensing of the piston or gate position), the movable member is positionable at a desired location within a valve housing to control the extent to which the valve is positioned between the fully open and closed positions.

In a preferred arrangement, shown in FIG. 1, the valve is used in conjunction with a sensor 500 capable of determining the flow of entrained product. Sensor 500 can monitor product rate or seed count, for example, and provide a feedback signal to controller 35 thereby allowing the movable member of the valve to be adjusted based on the measured flow rather than the intended flow. A sensor 500 is preferably installable on each primary delivery conduit 11 or each secondary delivery conduit 29.

In an even more preferred arrangement, the above described position feedback and sensor feedback schemes are used together to position the movable member of the valve. In this case, the controller moves the movable member to a particular position that is intended to provide a desired product flow rate. The sensor then provides feedback as to the actual flow rate, and the position of the movable member is fine tunable to achieve the desired product flow.

Figure 8:
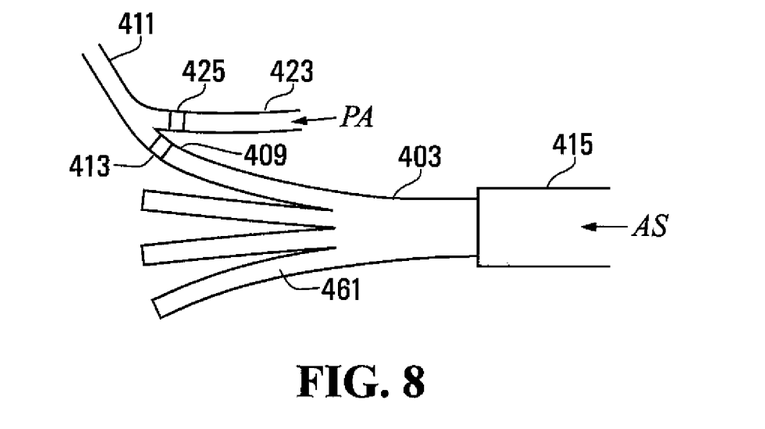
FIG. 8 is a schematic top view of an embodiment of an air distribution manifold apparatus of the present invention where the manifold is an inline flat fan type manifold.

An alternative manifold body 403 is schematically illustrated in FIG. 8. The manifold body 403 is a flat fan type manifold body where the supply conduit 415 directs the product air stream AS into a first end of the flat manifold body 403 which divides the product air stream AS into channels 461 with the ports 409 at the ends of the channels 461 on a second opposite end of the flat manifold body 403. An exhaust conduit 423 is connected as described above to receive a clean air stream from an exhaust orifice at an upstream elbow, or from another source. A port valve 413 and exhaust valve 425 control flow of either the product air stream AS or exhaust air stream PA to the delivery conduit 411 as described above.

Figure 10:
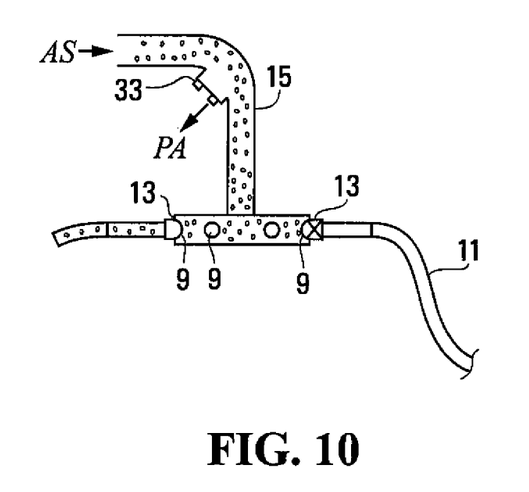
FIG. 10 is a schematic cutaway side view of a further embodiment of the air distribution apparatus which operates without exhaust valves.
Figure 11:
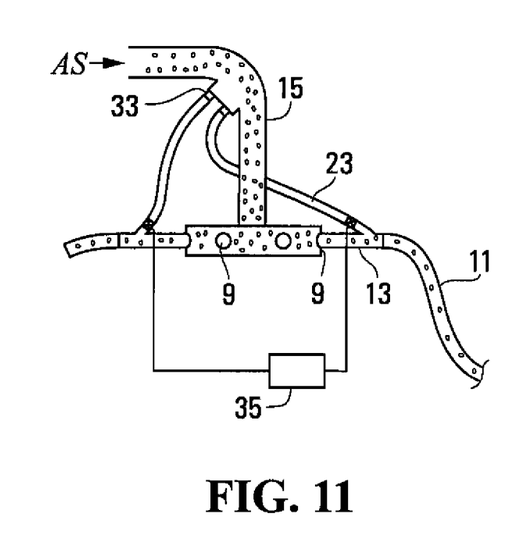
FIG. 11 is a schematic cutaway side view of a still further embodiment of the air distribution apparatus which relies on exhaust air conduits without exhaust valves.

FIGS. 10 and 11 illustrate further embodiments of the air distribution apparatus of the present invention which rely on exhaust orifices without exhaust valves.

In FIG. 10, there is shown an arrangement where at least one exhaust orifice 33 is defined in the supply conduit 15. As in previous embodiments, each port 9 includes a port valve 13 controlled to operate between open and closed positions of the valve such that when the port valve is in the closed position the delivery conduit 11 is disconnected from the interior of the manifold body and pressurized air PA from the interior of the supply conduit flows through the at least one exhaust orifice 33. Each port valve 13 is adjustable to intermediate positions between the open and closed positions. In this arrangement, the at least one exhaust orifice 33 is always open to atmosphere and configured to generate a back pressure at least as high as a back pressure in the delivery conduit. By sizing the overall cross-section of the one or more orifices to produce a similar or slightly higher back pressure than that in the delivery conduit, little delivery air bypasses through the exhaust orifices until port valves are moved toward closed positions. As the port valves are closed, back pressure in the system increases resulting in air flow being diverted through the one or more exhaust orifices to compensate for the decrease in flow through the port valve.

FIG. 11 illustrates an embodiment similar to that of FIG. 10 with one or more exhaust orifices 33 without exhaust valves. In this case, each exhaust orifice defined in the supply conduit 15 has an exhaust conduit 23 communicating the exhaust orifice with an associated delivery conduit 11 for flow of pressurized air through the exhaust orifice to the delivery conduit. As in previous embodiments, each port 9 includes a port valve 13 which is controlled to operate between open and closed positions such that when the port valve is in the closed position the corresponding delivery conduit is disconnected from the interior of the manifold body, and pressurized air from the interior of the supply conduit 15 flows through the exhaust orifice 33 to the corresponding delivery conduit 11. Each port valve 13 is adjustable to intermediate positions between the open and closed positions. In this arrangement, the exhausted air from the supply conduit 15 is always in communication with the delivery conduits. In operation, there is sufficient back pressure in the delivery conduits 11 when entrained with product that insignificant air bypasses through the exhaust conduits 23. When one or more port valves 13 is moved toward the closed position, back pressure drops in the corresponding delivery conduit 11 allowing more air to bypass through the exhaust orifice 33 and out the delivery conduit 11.

Thus, embodiments of the present invention provide a variable product flow and a variable air stream exhaust flow to maintain air speed in the supply conduit above the critical velocity. The exhausted air can also be directed into the delivery conduit of full or partially closed ports to clear delivery conduits and manifolds downstream.

A method is provided of controlling delivery of an agricultural product to a selected section of furrow openers 31 of an air seeder 51. In a typical practice of the method the product air stream AS is provided by a conventional air seeder fan and metering system mounted on an air seeder cart 55.

Figure 9:
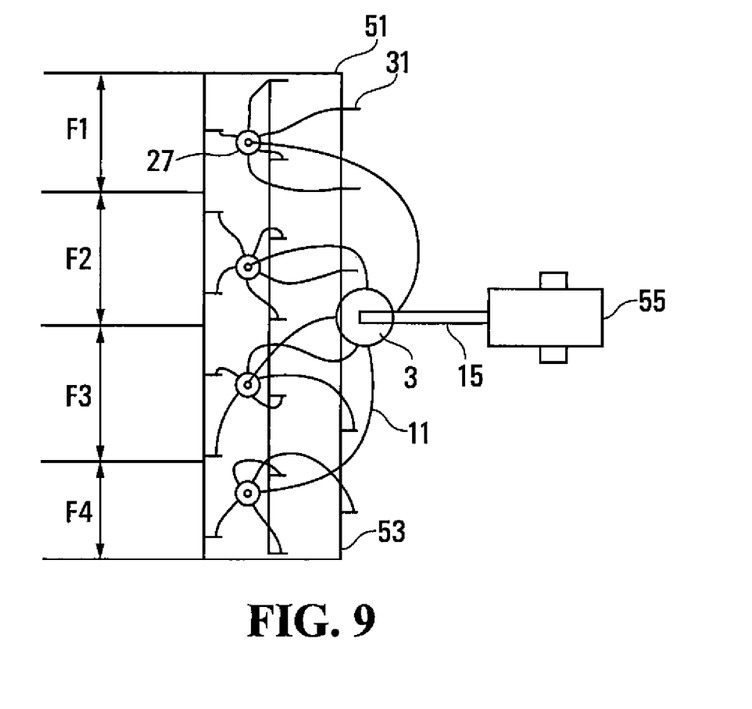
FIG. 9 is a schematic top view of an air seeder showing field strips seeded by furrow openers in adjacent sections of furrow openers.

In the embodiment illustrated in FIG. 9, each section of furrow openers comprises a secondary manifold 27 connected to a plurality of furrow openers 31. The furrow openers 31 are spaced laterally across a frame 53 such that all the furrow openers fed by one secondary manifold 27 are laterally spaced from the furrow openers fed by an adjacent secondary manifold 27 such that the furrow openers of one section seed a field strip F1, while the furrow openers fed by an adjacent secondary manifold 27 seed an adjacent field strip F2. Thus as the strip of field area narrows to a width less than the air seeder 51, the flow of agricultural products is directed to selected sections of furrow openers 31 to seed any one or all of field strips F1, F2, F3, F4.

Alternatively, each "section" of furrow openers could comprise a single furrow opener fed from a secondary manifold with port and exhaust valves 13, 25 controlling the flow of the product air stream AS to each single furrow opener.

As shown in the accompanying drawings, the method comprises for each air seeder section providing a delivery conduit 11 connected at an output end thereof to deliver the agricultural product to the section of furrow openers 31, and connected at an input end thereof to a port 9 defined through a wall of a manifold body 3; connecting an output end of a supply conduit 15 to an interior of the manifold body 3, and directing a product air stream AS with the agricultural product 21 entrained therein into an input end of the supply conduit 15 such that the agricultural product moves through the supply conduit 15, the manifold body 3, the ports 9, and the delivery conduits 11 to each section of furrow openers 31; controlling a selected port 9 to vary the delivery of the agricultural product 21 to a selected section of furrow openers 31 and exhausting a selected flow of pressurized air PA from the supply conduit 15; stopping exhausting the selected flow of pressurized air PA from the supply conduit 15 and opening the selected port 9 to restart the delivery of the agricultural product to the selected section of furrow openers 31.

To avoid exhausting agricultural products entrained in the product air stream, the air seeder is configured such that the supply conduit 15 extends substantially vertically up from the manifold body 3 to a curved elbow 19 and then extends substantially horizontally from the elbow 19, and the selected flow of pressurized air PA is exhausted from the supply conduit 15 through an exhaust orifice 33 defined in the elbow 19 at an inner radius of the elbow 19.

The method described above may be performed using valves to control flow of product air streams and exhausted air streams. For example, a port valve 13 may be provided and configured to control communication of the delivery conduit 11 with an interior of the manifold body 3 through the port 9. In one embodiment, a plurality of exhaust orifices in the supply conduit may be used with one exhaust orifice associated with each port and each exhaust orifice being controlled by its own exhaust valve. The port valve and the exhaust valve are controllable to operate oppositely to each other between open and closed positions of the port valve and the exhaust valve such that when the port valve is closed the exhaust valve is open with the port valve and exhaust valve being adjustable to intermediate positions between the open and closed positions. When the port valve 13 is closed, the delivery conduit 11 is disconnected from the interior of the manifold body 3. The port valve is configured to adjust the selected port to permit a predetermined delivery of the agricultural product to the selected section of furrow openers with the exhaust valve being configured to exhaust a flow of pressurized air from the supply conduit to compensate for a decrease in flow through the port valve.

The delivery conduits may be cleared of agricultural products by connecting the exhaust orifice 33 to the delivery conduit 11 in proximity to the input end thereof such that the selected flow of pressurized air PA from the supply conduit 15 passes through the delivery conduit 11.

In an alternative embodiment of the above described method, a single exhaust orifice with a single exhaust valve is provided in the supply conduit. As with the first embodiment, each port valve is controllable to operate between open and closed positions of the port valve such that when the port valve is in the closed position, the delivery conduit is disconnected from the interior of the manifold body and pressurized air from the interior of the supply conduit flows through the exhaust orifice.

Each port valve is also configured to adjust the port to permit a predetermined delivery of the agricultural product to the selected section of furrow openers, with the exhaust orifice exhausting a flow of pressurized air from the supply conduit to compensate for a decrease in flow through the port valve. Each port valve is controllable to operate between open and closed positions of the port valve such that when the port valve is in the closed position, the delivery conduit is disconnected from the interior of the manifold body and pressurized air from the interior of the supply conduit flows through the exhaust orifice.

The apparatus and method of the embodiments of the present invention allows for infinite adjustment of the valves. This enables the rate of the product flowing through one section to be adjusted. As a port valve gradually moves from "on" to "off", the rate of flow of the product air stream is reduced. This provides additional functionality to the airseeding system including:

1. Improved primary distribution coefficients of variation (CV)
   Section port valves can be partially closed for ports that receive a higher than proportionate amount of product, to bias product to ports receiving less product.
2. Variable product flow rates by section
   Many precision farming prescription maps have a finer resolution than the seeder is capable of providing. Rather than the seed meter being the only function capable of affecting the rate (to the full drill width), the port valve can adjust the rate of product flow (to each drill section).
3. Turn compensation by section
   On a turn, the outside section of the drill is travelling fastest, and the inside section is travelling slowest. The system and method described above allows the rate of product flow for each section to be adjusted (based on the speed each individual section is travelling).
4. Sectional control by row
   When the rate of product flow to each secondary is controllable, the ASC system can be moved from the primary to secondary locations. This allows row-by-row section control rather than section-by-section.
5. Improved secondary distribution CVs
   The same concept as #1 can be applied to the secondary manifold, resulting in improved secondary coefficients of variation.
6. Variable rate by row
   The same concept as #2 may be applied to the secondary manifold. When used in combination with the adjustable primary system, the system and method of the present invention allow for the product flow rate to be varied to every row individually.
7. Turn compensation by row
   The same concept as #3 can be applied to the secondary manifold. When used in combination with the adjustable primary system, the system and method of the present invention allow for the product flow rate to be varied such that every row will apply at the correct rate on a turn.

The foregoing is considered as illustrative only of the principles of the various embodiments of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. An air distribution apparatus comprising:
a manifold body, and a plurality of ports defined through a wall of the manifold body;
a delivery conduit connected to each one of the plurality of ports;
on at least one of the plurality of ports, a port valve configured to communicate an interior of the manifold body with the delivery conduit associated with the at least one of the plurality of ports;
a supply conduit connected at an output end thereof to the interior of the manifold body, and connected at an input end thereof to receive a product air stream with agricultural products entrained therein;
an exhaust orifice defined in the supply conduit, and an exhaust valve configured to control a flow of pressurized air from an interior of the supply conduit through the exhaust orifice;

wherein the port valve and exhaust valve are controlled to operate oppositely to each other between open and closed positions of each valve such that when the port valve is in the closed position, the exhaust valve is in the open position with the delivery conduit being disconnected from the interior of the manifold body and, when the exhaust valve is in the closed position, the port valve is in the open position and pressurized air from the interior of the supply conduit is prevented from flowing through the exhaust orifice; and wherein the port valve and the exhaust valve are adjustable to intermediate positions between the open and closed positions.

2. The apparatus of claim 1 wherein each of the port valve and the exhaust valve includes a movable member that is positionable between the open and closed positions of the valve to adjust an extent to which the valve is open.

3. The apparatus of claim 2 wherein the position of the movable member is controllable by position feedback.

4. The apparatus of claim 2 including a sensor in each delivery conduit associated with the port valve to determine a flow rate of the entrained agricultural product, the sensor providing a feedback signal to control positioning of the movable member.

5. The apparatus of claim 1 wherein the exhaust orifice is open to atmosphere, such that pressurized air from the interior of the supply conduit flows through the exhaust orifice into the atmosphere when the exhaust valve is not in the closed position.

6. The apparatus of claim 1 comprising an exhaust conduit connected at an input end thereof to the supply conduit and with an output end thereof connected to an exhaust destination, such that the flow of pressurized air flows through the exhaust conduit.

7. The apparatus of claim 6 in which the input end of the exhaust conduit is connected to the exhaust orifice.

8. The apparatus of claim 6 in which the input end of the exhaust conduit is connected to the exhaust valve.

9. The apparatus of claim 6 wherein the output end of the exhaust conduit is connected to the delivery conduit associated with the at least one of the plurality of ports such that the flow of pressurized air flows through the delivery conduit.

10. The apparatus of claim 9 comprising a valve assembly connected to the port, the delivery conduit, and the exhaust conduit, and wherein the port valve and the exhaust valve are incorporated in the valve assembly.

11. The apparatus of claim 10 wherein the port valve and exhaust valve are connected such that as the port valve is closed the exhaust valve is opened, and such that as the port valve is opened the exhaust valve is closed.

12. The apparatus of claim 1 wherein a size of the exhaust orifice is configured such that the flow of pressurized air flowing through the exhaust orifice when the exhaust valve is open is substantially the same as an amount of air flowing through the port when the port valve is open.

13. The apparatus of claim 1 wherein the delivery conduit is connected at an output end thereof to a secondary manifold.

14. The apparatus of claim 1 comprising:

a plurality of port valves, each one of the plurality of port valves associated with one of the plurality of ports in the manifold body;

wherein the plurality of port valves and the exhaust valve are controlled such that as each one of the plurality of port valves are closed to intermediate positions, the exhaust valve opens to an extent such that the selected flow of pressurized air flowing from the interior of the supply conduit through the exhaust orifice substantially compensates for any decrease in flow through the plurality of port valves, and such that when the plurality of port valves are closed, the exhaust valve moves to the open position.

15. The apparatus of claim 14 in which the intermediate positions of the exhaust valve and the port valve operate substantially in an inverse variation relationship to each other.

16. The apparatus of claim 1 wherein the supply conduit extends substantially vertically up from the manifold body to a curved elbow and then extends substantially horizontally from the elbow and the exhaust orifice is defined in the elbow at an inner radius of the elbow.

17. The apparatus of claim 1 wherein the exhaust valve and the port valve are adjustable to intermediate positions such that flow through the exhaust valve substantially compensates for any decrease in flow through the port valve.

18. The apparatus of claim 1 comprising:

a plurality of port valves, each one of the plurality of port valves being associated with one of the plurality of ports in the manifold body;

a plurality of exhaust orifices, each one of the plurality of exhaust orifices corresponding with one of the plurality of ports and each one of the plurality of exhaust orifices having an associated exhaust valve;

wherein the plurality of port valves and the plurality of exhaust valve are controlled such that as one of the plurality of port valves is closed to intermediate positions, the exhaust valve of the corresponding exhaust orifice opens to an extent such that the flow of pressurized air flowing from the interior of the supply conduit through the exhaust valve substantially compensates for any decrease in flow through the port valve, and such that when the port valves is closed, the exhaust valve moves to the open position.

19. The apparatus of claim 18 comprising a plurality of exhaust conduits, each one of the plurality of exhaust conduits being connected at an input end thereof to the supply conduit and with an output end thereof connected to an exhaust destination, such that pressurized air flows through the exhaust conduit.

20. The apparatus of claim 19 in which the input end of each one of the plurality of exhaust conduits is connected to a corresponding one of the plurality of exhaust orifices.

21. The apparatus of claim 19 in which the input end of each one of the plurality of exhaust conduits is connected to a corresponding one of the plurality of exhaust valves.

22. The apparatus of claim 19 wherein the output end of each one of the plurality of exhaust conduits is connected to a corresponding delivery conduit connected to each one of the plurality of ports such that the flow of pressurized air flows through the corresponding delivery conduit.

23. An air distribution apparatus comprising:
   a manifold body, and a plurality of ports defined through a wall of the manifold body;
   a delivery conduit connected to each one of the plurality of ports;
   on at least one of the plurality of ports, a port valve configured to communicate an interior of the manifold body with the delivery conduit associated with the at least one of the plurality of ports;
   a supply conduit connected at an output end thereof to the interior of the manifold body, and connected at an input end thereof to receive a product air stream with agricultural products entrained therein;
   at least one exhaust orifice defined in the supply conduit;
   wherein the port valve is controlled to operate between open and closed positions of the valve such that when the port valve is in the closed position the delivery conduit is disconnected from the interior of the manifold body and pressurized air from the interior of the supply conduit flows through the at least one exhaust orifice; and
   wherein the port valve is adjustable to intermediate positions between the open and closed positions.

24. The apparatus of claim 23 in which the at least one exhaust orifice is configured to generate a back pressure at least as high as a back pressure in the delivery conduit.

25. An air distribution apparatus comprising:
   a manifold body, and a plurality of ports defined through a wall of the manifold body;
   a delivery conduit connected to each one of the plurality of ports;
   a plurality of port valves, each one of the plurality of port valves being associated with one of the plurality of ports in the manifold body to communicate an interior of the manifold body with the delivery conduit connected to the port;
   a supply conduit connected at an output end thereof to the interior of the manifold body, and connected at an input end thereof to receive a product air stream with agricultural products entrained therein;
   at least one exhaust orifice defined in the supply conduit having an exhaust conduit communicating the at least one exhaust orifice and the delivery conduits for flow of pressurized air through the exhaust orifice to the delivery conduits;
   wherein each one of the plurality of port valves is controlled to operate between open and closed positions such that when the port valve is in the closed position the corresponding delivery conduit is disconnected from the interior of the manifold body, and pressurized air from the interior of the supply conduit flows through the at least one exhaust orifice to the corresponding delivery conduit; and
   wherein each one of the plurality of port valves is adjustable to intermediate positions between the open and closed positions.

26. A method of controlling delivery of an agricultural product to a selected section of furrow openers of an air seeder, the method comprising:
   for each air seeder section providing a delivery conduit connected at an output end thereof to deliver the agricultural product to the section of furrow openers, and connected at an input end thereof to a port defined through a wall of a manifold body;
   connecting an output end of a supply conduit to an interior of the manifold body, and directing a product air stream with the agricultural product entrained therein into an input end of the supply conduit such that the agricultural product moves through the supply conduit, the manifold body, the ports, and the delivery conduits to each section of furrow openers;
   providing a port valve configured to control communication of the delivery conduit with an interior of the manifold body through the port;
   providing an exhaust orifice defined in the supply conduit with an exhaust valve;
   wherein the port valve and the exhaust valve are controllable to operate oppositely to each other between open and closed positions of the port valve and the exhaust valve such that when the port valve is closed the exhaust valve is open with the port valve and exhaust valve being adjustable to intermediate positions between the open and closed positions; and
   configuring the port valve to adjust the selected port to permit a predetermined delivery of the agricultural product to the selected section of furrow openers, with the exhaust valve being configured to exhaust a flow of pressurized air from the supply conduit to compensate for a decrease in flow through the port valve.

27. The method of claim 26 wherein closing the port valve to close the selected port stops the delivery of the agricultural product to the selected section of furrow openers, the exhaust valve being automatically opened to exhaust the flow of pressurized air from the supply conduit to compensate for the decrease in flow through the port valve.

28. The method according to claim 26 wherein moving the port valve to a position other than the closed position restarts the delivery of the agricultural product to the selected section of furrow openers at a rate determined by the intermediate position of the valve through the selected port, with concomitant closing of the exhaust valve to reduce the exhausting of the flow of pressurized air from the supply conduit at a compensating rate.

29. The method of claim 26 wherein the supply conduit extends substantially vertically up from the manifold body to a curved elbow and then extends substantially horizontally from the elbow and wherein the exhaust orifice is defined in the elbow at an inner radius of the elbow.

30. The method of claim 26 comprising connecting the exhaust orifice to the delivery conduit in proximity to the input end thereof such that the selected flow of pressurized air from the supply conduit passes through the delivery conduit.

31. The method of claim 26 wherein the selected section of furrow openers comprises one of a secondary manifold connected to a plurality of furrow openers and a single furrow opener.

32. The method of claim 26 wherein each of the port valve and the exhaust valve includes a movable member and configuring the valves comprises positioning the movable member at predetermined locations between the open and closed positions to adjust an extent to which the valve is open.

33. The method of claim 32 wherein position feedback is used to control the position of the movable member.

34. The method of claim 32 including a sensor in each delivery conduit associated with the port valve, the sensor determining a flow rate of the entrained agricultural product and providing a feedback signal to control positioning of the movable member.

35. The method of claim 26 wherein the exhaust orifice opens to atmosphere such that pressurized air from the interior of the supply conduit flows through the exhaust orifice to atmosphere.

36. The method of claim 26 comprising an exhaust conduit connected at an input end thereof to the exhaust orifice and with an output end thereof connected to an exhaust destination, such that the selected flow of pressurized air flows through the exhaust conduit.

37. A method of controlling delivery of an agricultural product to a selected section of furrow openers of an air seeder, the method comprising:
for each air seeder section providing a delivery conduit connected at an output end thereof to deliver the agricultural product to the section of furrow openers, and connected at an input end thereof to a port defined through a wall of a manifold body;
connecting an output end of a supply conduit to an interior of the manifold body, and directing a product air stream with the agricultural product entrained therein into an input end of the supply conduit such that the agricultural product moves through the supply conduit, the manifold body, the ports, and the delivery conduits to each section of furrow openers;
providing a port valve configured to control communication of the delivery conduit with an interior of the manifold body through the port;
providing an exhaust orifice defined in the supply conduit;
wherein the port valve is controllable to operate at an open position, a closed position and intermediate positions between the open position and the closed position whereby when the port valve is in the closed position, the delivery conduit is disconnected from the interior of the manifold body and pressurized air from the interior of the supply conduit flows through the exhaust orifice;
configuring the port valve to one of the intermediate positions to adjust the port to permit a predetermined delivery of the agricultural product to the selected section of furrow openers, with the exhaust orifice exhausting a flow of pressurized air from the supply conduit to compensate for a decrease in flow through the port valve.

* * * * *